No. 870,607. PATENTED NOV. 12, 1907.
W. E. AMBERG.
CAR TRUCK.
APPLICATION FILED APR. 1, 1907.

3 SHEETS—SHEET 1.

Witnesses:
G. W. Nelson
M. Simon

Inventor
Walter E. Amberg
by
Charles Simian Hawley
Atty.

No. 870,607. PATENTED NOV. 12, 1907.
W. E. AMBERG.
CAR TRUCK.
APPLICATION FILED APR. 1, 1907.
3 SHEETS—SHEET 2.
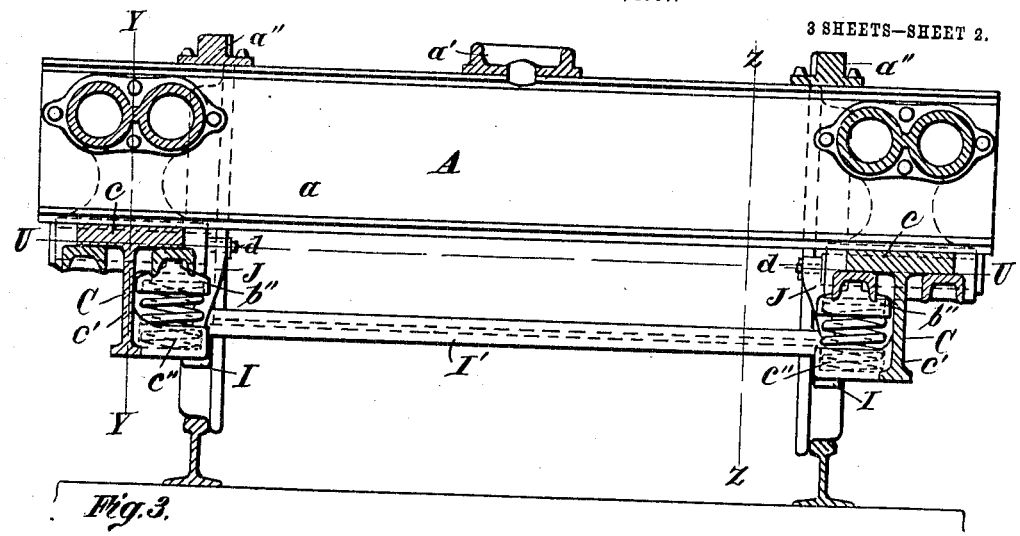
Fig. 3.
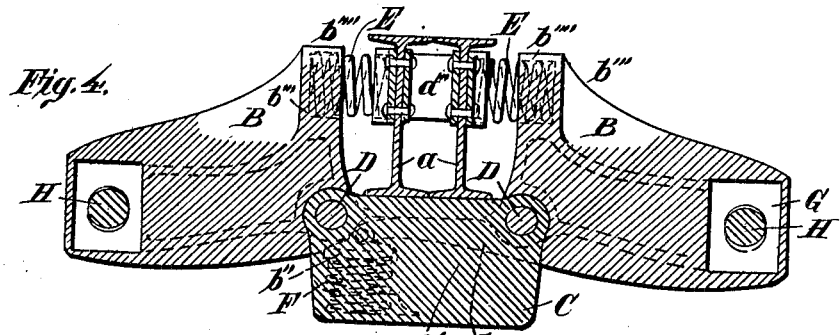
Fig. 4.
Fig. 5.
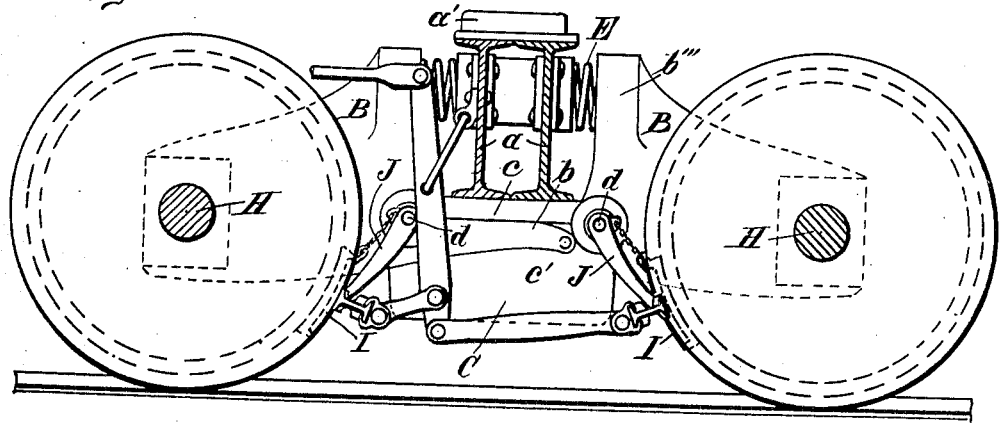
Witnesses:
G. H. Nelson
M. Simon
Inventor,
Walter E. Amberg
by
Charles Linton Townley
Att'y No. 870,607.

PATENTED NOV. 12, 1907.

W. E. AMBERG.
CAR TRUCK.
APPLICATION FILED APR. 1, 1907.

3 SHEETS—SHEET 3.

Witnesses:
G. H. Nelson
M. Simon

Inventor
Walter E. Amberg
by
Charles Edwin Howley
Atty.

UNITED STATES PATENT OFFICE.

WALTER E. AMBERG, OF CHICAGO, ILLINOIS.

CAR-TRUCK.

No. 870,607.

Specification of Letters Patent.

Patented Nov. 12, 1907.

Application filed April 1, 1907. Serial No. 365,728.

*To all whom it may concern:*

Be it known that I, WALTER E. AMBERG, a citizen of the United States, residing at Chicago, Cook county, Illinois, have invented certain new and useful Improvements in a Car-Truck, of which the following is a full, clear, and exact description, such as will enable others skilled in the art to which it appertains to make and use the same.

Though applicable to six and eight wheeled trucks for passenger cars my invention has special reference to improvements in four wheeled freight car trucks.

The object of my invention is to improve the construction of car trucks with a view to a better distribution and disposition of the load sustaining springs to the end that the trucks shall be more delicately responsive to jars and shocks and thereby protect the car body and its load from excessive strains.

Still further objects of my invention will appear hereinafter.

My invention consists generally in a car truck comprising wheels and axles, in combination with a load sustaining transom wherein or whereon the truck center is placed and spring supported, pivotally articulated side frames borne by the axles and supporting said transom.

My invention also consists in various novel details of construction and in combinations of parts, all as hereinafter described and particularly pointed out in the claims.

Figure 1:
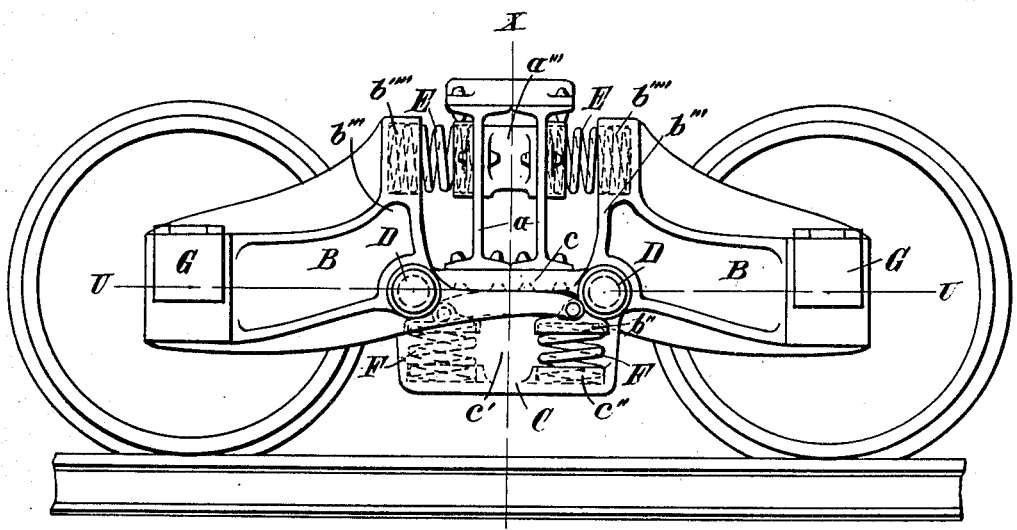
Figure 2:
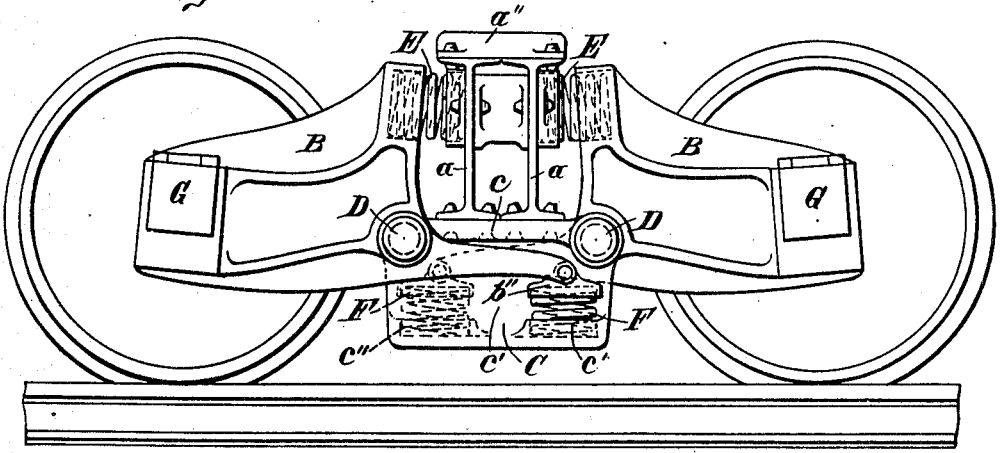
Figure 6:
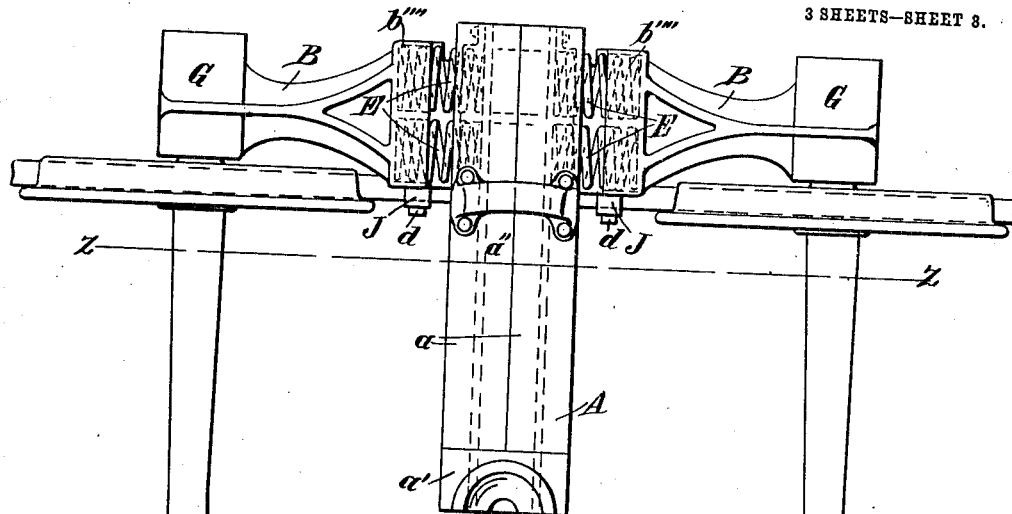
Figure 7:
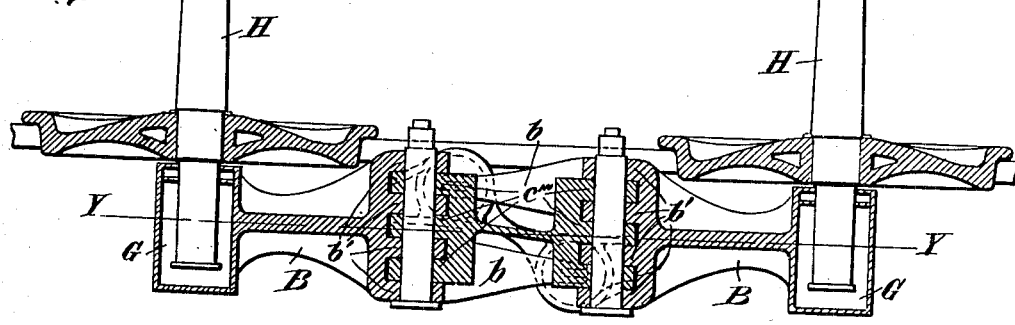
Figure 7:
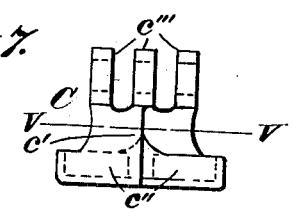
Figure 8:
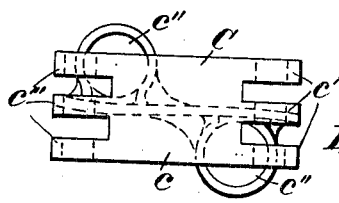
Figure 9:
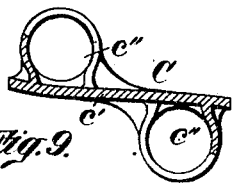

The invention will be more readily understood by reference to the accompanying drawings forming a part of this specification and in which:

Figure 1 is a side elevation of a freight car truck embodying my invention; Fig. 2 is a similar view showing the transom depressed; Fig. 3 is a vertical transverse section on the line X—X of Fig. 1; Fig. 4 is a longitudinal vertical section on the lines Y—Y of Figs. 3 and 6; Fig. 5 is a vertical section on the lines Z—Z of Figs. 3 and 6; Fig. 6 is a plan view of the car truck, one half thereof being shown in horizontal section on the lines U—U of Figs. 1 and 3; Figs. 7, 8 and 9 are detail views of one of the transom and spring carriers; forming a part of the side frame; Fig. 7, being an end elevation of the casting, Fig. 8 a plan view thereof, and Fig. 9 a horizontal section on the line V—V of Fig. 7.

In these drawings I have shown my invention as it appears, in preferred form, in a four wheeled freight car truck. The drawings disclose the principle of the invention and while six and eight wheel car trucks, are not shown, it will be readily understood that my invention is applicable to such trucks and is not confined to four wheel trucks.

In carrying out my invention, in the particular form herein shown, I dispense with the usual truck bolster and employ a simple load sustaining member or transom, A, in its place. I also dispense with the usual rigid arch bar side frames and substitute therefor two articulated side frames each made up, preferably, of three members, B, B and C. The members, B, B and C are hinged, in other words, pivotally connected, by hinge pins, D, D.

The ends of the transom, A, rest upon the tops of the mid-members, C, C, of the side frames, at opposite sides of the truck. Springs, E, E are, in each side frame, interposed between the members, B, B, and the transom, and other springs, F, F, are interposed between the members, B, B, and the member, C. Together these springs sustain or support the connected members of respective side frames in the manner shown in Fig. 1. When the transom is depressed by a load imposed thereon the members, C, C, are forced down and the members, B, B, acting against the springs, E and F place the latter under increased compression, the springs ultimately sustaining the transom load as indicated in Fig. 2. The side frames include or are attached to the journal boxes, G—G on the wheel axles, H—H. The brake shoes, I, and the brake beams, I', are sustained by links, J, attached to the members, C, C, i. e. are preferably pivoted on ends of the pivot or hinge pins, D. The brake operating mechanism, K, is of ordinary construction and is sustained from the transom as shown in Fig. 5. When the transom and the side frame are depressed by a load, the brake shoes will be likewise depressed; the thrust thereof against the wheels being somewhat increased, when the brake mechanism is in action.

Having now briefly described a car truck embodying my invention, I will proceed to the description of the several members thereof in detail.

The principal members of the transom, A, are two I beams, a, a. The upper flanges of these beams are connected by the center bearing plate, a', and by the side bearing plates, a''. They may be reinforced by additional parts when required. The lower flanges of the I beams, a, a, rest upon and are either riveted or bolted to the tops of the members, C, C. It will now be seen that the members, C, C, are common to the transom and to the side frame members, B, being interposed between the bolster and said members, B. The members, C, are identical in form, but are preferably reversed in position as shown in Fig. 3.

Each member, C, comprises the horizontal plate portion, c, a vertical web, c', and two spring pockets, c'', c'', arranged on opposite sides of the web and at opposite ends thereof as well shown in Figs. 7, 8 and 9. The ends of the horizontal portion, c, are provided with a plurality of hinge lugs, c''', containing holes for the hinge pins, D, D. It will be noted that the web or depending portion c' effectually strengthens the horizontal portion c, but its principal function is that of a 11 carrier for the spring brackets or pockets c″ which underlie the overhanging inner and outer parts of the portion c. The springs, F, F, rest in the spring pockets, c″.

With the exception of the journal boxes which as shown are preferably integral parts thereof, the members, B, B, are identical in form but occupy reversed positions having arms b, b, which extend in opposite directions on opposite sides of the web portion of the member, C. The lower inner corners of the members B are formed to fit the hinge lugs of the member C and are provided with holes to receive the hinge pins, D. In this manner the members, B, B, are hinged upon the members C.

As shown in Fig. 1, I prefer that the members, B, shall have an even number of hinge lugs, b′, so that the ends of the hinge pin may be secured in the members, B. The arms, b, extend beneath the plate portion, c, of the member, C, and at points above the respective spring pockets, c″, are provided with spring caps, b″, which rest upon the springs, F. These springs normally hold the arms up against the bottom of the member, C, and in this position the centers of the hinge pins are substantially in line with the centers of the car wheel axles. Each member, B, is provided with an upwardly extending arm, b‴, containing two spring pockets, b⁗, adjacent to the sides of the transon. As well shown in the drawings the springs, E, E, occupy the pockets, b⁗, and press against the sides of the transom. As shown in Figs. 1, 2, and 4, I prefer to reinforce the transom in transverse direction by means of blocks, a‴, in horizontal line with the springs, E, E. It will be obvious that a single spring, E may be employed between each member, B, and the transom, but I prefer to use the springs in parts as shown. The springs, E, E, by tending to separate the upper parts of arms, b″, of the members B, operate to raise the hinge points thereof, thereby assisting the springs in supporting the load on the transom. When the transom is depressed all of the springs are further compressed and the arrangement is such that the arms, b″, of the members, B, B, will strike against the side blocks on the transom before any of the springs are completely closed, thereby saving the springs from damage. A further function of the side springs, E, E, is to prevent the rocking of the transom and the members, C, when the trucks are stopped or retarded by means of the brakes at which times the car body tends to continue its forward movement. The side springs at such times ease the shock on the car body and retard its motion until equilibrium is restored.

The brake mechanism as before stated may be of any suitable design or kind and differs from other mechanisms only to the extent that it is suspended from the vertically movable portions of the truck as shown in Figs. 3, 5 and 6. The brake hanger arms, J, are preferably mounted upon the ends, d, of the hinge pins, D.

As before stated the transom, A, and the members, C, being fastened together practically constitute a single part and it will be obvious that in making these parts of cast steel they may be cast as one part or element of the truck. Nevertheless in describing the construction of my truck I have also found it necessary to refer to the members or portions, C, C, as constituting the mid parts of said frames.

Various modifications of my invention will readily suggest themselves to one skilled in the art and I therefore do not confine the invention to the specific constructions herein shown and described.

Having thus described my invention, I claim as new and desire to secure by Letters Patent:

1. A car truck comprising wheels and axles, in combination with a load-sustaining transom, and pivotally articulated spring containing and supported side-frames carrying said transom, substantially as described.

2. A car truck comprising wheels and axles, in combination with a load-sustaining transom, having a truck center, and pivotally articulated spring supported side frames carrying said transom, substantially as described.

3. A car truck comprising wheels and axles, in combination with side frames connecting said axles, each said side-frame comprising a plurality of pivotally connected parts, a transom connecting and resting upon said side-frames, and springs interposed between the parts of said side-frame to support the same in elevated position, substantially as described.

4. A car truck comprising wheels and axles, in combination with side frames connecting said axles, each said side-frame comprising a plurality of pivotally connected parts, a transom connecting and resting upon said side-frames, and springs interposed between the parts of said side-frame, and between said parts and said transom substantially as described.

5. A car truck comprising wheels and axles, in combination with a bolster having hinge portions at its ends, side frame members extending from said axles and hinged upon said transom, and springs interposed between said transom and said side frame members, substantially as described.

6. A car truck comprising wheels and axles, in combination with a transom having hinge members upon its ends, spring brackets depending from the ends of said transom, side frame members extending from said axles and at their inner ends hinged upon said transom, said side frame members having arms extending beneath the ends of said transom and springs interposed between said arms and said brackets, substantially as described.

7. A car truck comprising wheels and axles, in combination with a transom having hinge members upon its ends, spring brackets depending from the ends of said transom, side frame members extending from said axles and at their inner ends hinged upon said transom, said side frame members having arms extending beneath the ends of said transom, springs interposed between said arms and said bracket and other springs interposed between the upper portions of said members and the sides of said transom, substantially as described.

8. A car truck comprising wheels and axles, in combination with a transom, side frame members extending from said axles and at their inner ends hinged to said transom and springs interposed between said side frame members and said transom and holding said members and said transom in elevated positions, substantially as described.

9. A car truck comprising wheels and axles, in combination with a transom, side frame members extending from said axles and at their inner ends hinged to the lower part of said transom, said side frame members having arms adjacent to the sides of said transom and springs interposed between the said arms and said transom, substantially as described.

10. A car truck comprising wheels and axles, in combination with a transom, side frame members extending from said axles and at their inner ends hinged upon said transom, said side frame members having upwardly extending arms, springs tending to distend said arms, other substantially horizontal arms upon said side frame members and springs interposed between the same and said bolster, substantially as described.

11. A car truck comprising wheels and axles, in combination with a transom, side frame members extending from said axle and hinged upon said transom, spring brackets depending from said transom, substantially horizontal arms extending from said side frame members and springs interposed between said arms and said brackets, substantially as described.

12. A car truck comprising wheels and axles, in combination with side frame members extending from said axles, mid-members whereon respective pairs of side frame members are hinged, spring brackets depending from said mid-members, springs interposed between said brackets and said side frame members and means whereby the load is transmitted to said mid-members, substantially as described.

13. A car truck comprising wheels and axles, in combination with pairs of side frame members extending from said axles and provided with horizontal and vertical arms, mid-members whereon respective pairs of members are hinged, springs tending to separate the vertical arms of said members and other springs interposed between said mid-members and the horizontal arms of respective side frame members, substantially as described.

14. A car truck, comprising wheels and axles, in combination with pivotally articulated side frames, a transom resting upon said side frames, springs arranged between the parts and supporting the same in elevated position and a suspended brake mechanism vertically movable with said transom, substantially as described.

15. A car truck comprising wheels and axles, in combination with a transom, mid-members at the ends thereof, side frame members extending from said axles and having horizontal and vertical arms, hinge pins whereby said frame members are attached to the ends of said mid-members and springs interposed between said frame and mid-members and between said frame members and said transom, substantially as described.

16. A car truck comprising wheels and axles, in combination with a transom, pivotally articulated spring containing and supported side frames carrying said transom and said side frames having integral journal boxes, substantially as described.

In testimony whereof, I have hereunto set my hand, this 22nd day of March, 1907, in the presence of two subscribing witnesses.

WALTER E. AMBERG.

Witnesses:
CHARLES GILBERT HAWLEY,
GEORGE J. READ.